United States Patent
Koshy et al.

(10) Patent No.: US 11,032,018 B1
(45) Date of Patent: Jun. 8, 2021

(54) POWER MULTIPLEXED RADIOFREQUENCY SIGNAL PROCESSING

(71) Applicant: Perspecta Labs Inc., Basking Ridge, NJ (US)

(72) Inventors: John C. Koshy, Basking Ridge, NJ (US); Joseph C. Liberti, Basking Ridge, NJ (US); Eric C. Beck, Basking Ridge, NJ (US); Nicholas Chang, Basking Ridge, NJ (US); Eddie Fung, Basking Ridge, NJ (US); Nan Muang, Basking Ridge, NJ (US); Robert A. Zeigler, Basking Ridge, NJ (US)

(73) Assignee: PERSPECTA LABS INC., Basking Ridge, NJ (US)

( * ) Notice: Subject to any disclaimer, the term of this patent is extended or adjusted under 35 U.S.C. 154(b) by 0 days.

(21) Appl. No.: 16/513,453

(22) Filed: Jul. 16, 2019

Related U.S. Application Data

(60) Provisional application No. 62/698,493, filed on Jul. 16, 2018.

(51) Int. Cl.
  *H04J 1/00* (2006.01)
  *H04J 7/00* (2006.01)
  *H04B 1/10* (2006.01)

(52) U.S. Cl.
  CPC ............... *H04J 7/00* (2013.01); *H04B 1/10* (2013.01)

(58) Field of Classification Search
  CPC .................................... H04J 7/00; H04B 1/10
  See application file for complete search history.

(56) References Cited

U.S. PATENT DOCUMENTS

| | | | |
|---|---|---|---|
| 7,430,257 B1 * | 9/2008 | Shattil | H04B 1/707 342/367 |
| 8,538,272 B1 * | 9/2013 | Robinson | H04B 10/2543 398/158 |
| 10,567,103 B2 * | 2/2020 | Yin | H04B 7/26 |
| 2016/0352873 A1 * | 12/2016 | Oh | H04L 69/22 |
| 2017/0099098 A1 * | 4/2017 | Lin | H04B 7/26 |
| 2018/0254855 A1 * | 9/2018 | Shin | H04L 1/007 |
| 2018/0351609 A1 * | 12/2018 | Park | H04L 25/0204 |
| 2020/0067466 A1 * | 2/2020 | Kushnir | H03F 1/3247 |

* cited by examiner

*Primary Examiner* — Brian D Nguyen
(74) *Attorney, Agent, or Firm* — Heslin Rothenberg Farely & Mesiti P.C.

(57) ABSTRACT

There is set forth herein, in one embodiment, obtaining with a radiofrequency receiver a combined radiofrequency signal having a first stream combined with a second stream, wherein the first stream has a first power level, and wherein the second stream has a second power level, the first power level of the first stream being greater than the second power level of the second stream, wherein the radiofrequency receiver includes one or more antenna; processing the combined radiofrequency signal to recover a first digital bitstream associated to the first stream; and recovering a digital bitstream associated to the second stream using the first digital bitstream.

20 Claims, 11 Drawing Sheets

POWER MULTIPLEXED RADIOFREQUENCY SIGNAL PROCESSING

CROSS-REFERENCE TO RELATED APPLICATION

This application claims the benefit of priority of U.S. Provisional Patent Application No. 62/698,493, filed Jul. 16, 2018, entitled "Power Multiplexed Radiofrequency Signal Processing", which is incorporated by reference herein in its entirety.

GOVERNMENT RIGHTS STATEMENT

This invention was made with U.S. Government support under Agreement No. FA8750-16-C-0189 awarded by DARPA. The U.S. Government has certain rights in this invention.

BACKGROUND

Various proposals have been made for increased data rates in radiofrequency signal transmissions. A data rate of a radio link can be increased using multiple-input and multiple-output (MIMO) techniques. MIMO refers to a method for sending and receiving more than one data signal over a common radio channel using multipath propagation. MIMO has been incorporated into a variety of wireless communication standards including IEEE 802.11n (WiFi), WiMAX (4G) and Long-Term Evolution (LTE 4G).

BRIEF DESCRIPTION

There is set forth herein, in one embodiment, obtaining with a radiofrequency receiver a combined radiofrequency signal having a first stream combined with a second stream, wherein the first stream has a first power level, and wherein the second stream has a second power level, the first power level of the first stream being greater than the second power level of the second stream, wherein the radiofrequency receiver includes one or more antenna; processing the combined radiofrequency signal to recover a first digital bitstream associated to the first stream; and recovering a digital bitstream associated to the second stream using the first digital bitstream.

DRAWINGS

These and other features, aspects, and advantages set forth herein will become better understood when the following detailed description is read with reference to the accompanying drawings in which like characters represent like parts throughout the drawings, wherein.

DETAILED DESCRIPTION

Figure 1:
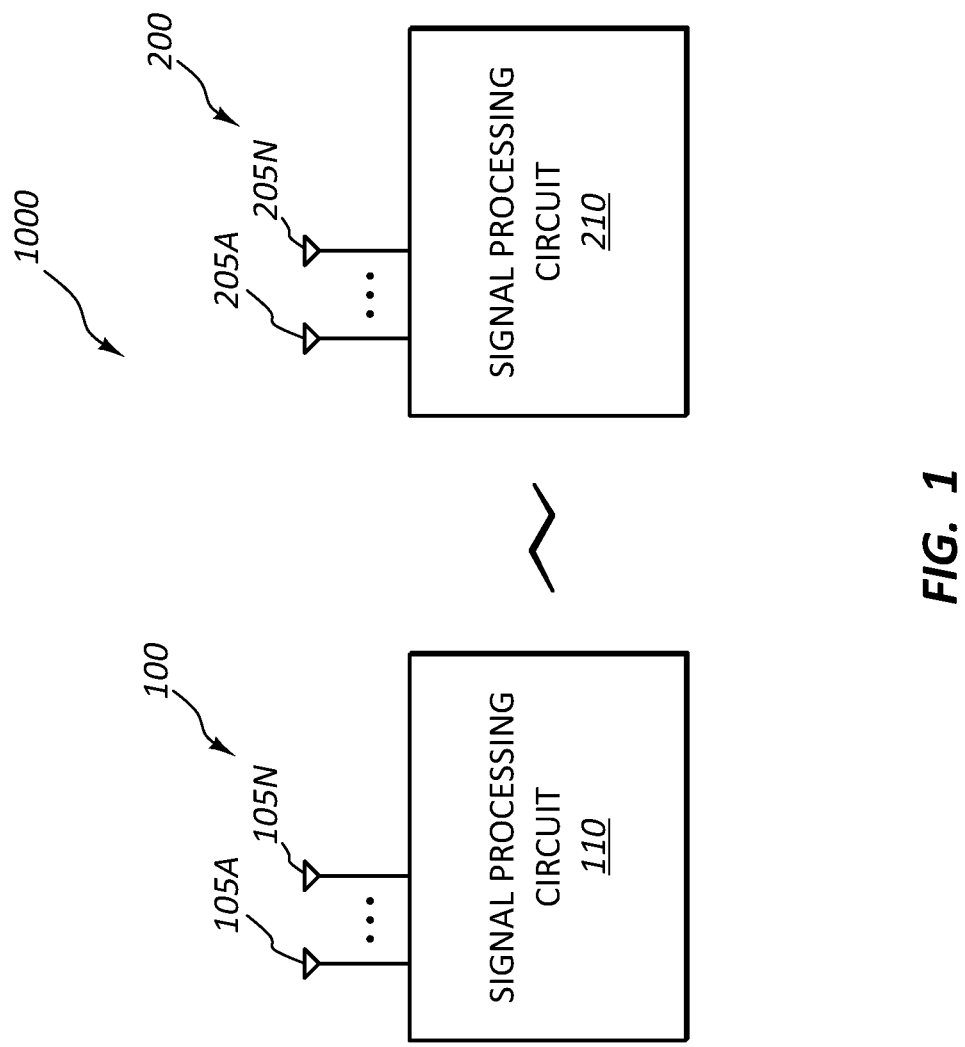
FIG. 1 is a block diagram of a radiofrequency signal transmission system having according to one embodiment.

A radiofrequency signal transmission system 1000 in one embodiment is set forth in FIG. 1. System 1000 can include a transmitter 100 having a first through Nth antennas 105A-150N each in wireline communication with a signal processing circuit 110, and a receiver 200. Receiver 200 can have first through Nth antennas 205A-205N each in wireline communication with signal processing circuit 210 of receiver 200.

In one embodiment, transmitter 100 can use a single antenna, e.g. only antenna 105A for transmission of a radiofrequency signal. In one embodiment, receiver 200 can use a single antenna, e.g. only antenna 205A for reception of a radiofrequency signal. In one embodiment, each of transmitter 100 and receiver 200 can use a single antenna, e.g. antenna 105A and antenna 205A for transmission and reception, respectively, of a radiofrequency signal. In one embodiment, transmitter 100 can include a single antenna, e.g. only antenna 105A. In one embodiment, receiver 200 can include a single antenna, e.g. only antenna 205A. In one embodiment, each of transmitter 100 and receiver 200 can include a single antenna, e.g. antenna 105A and antenna 205A.

Signal processing circuit 110 of transmitter 100 in one embodiment can include a combination of digital signal processing circuitry and analog signal processing circuitry. Signal processing circuit 110 for example, can perform such functions as obtaining an input digital bitstream, splitting the digital bitstream into a first digital bitstream and a second digital bitstream, modulating a baseband signal using a digital bitstream, upconverting a baseband signal by modulation of a carrier wave, and transmitting the upconverted signal for transmission by one or more antenna of the transmitter. Signal processing circuit 110 of transmitter 100 can perform signal processing functions associated with oscillator based transmitters such as amplifying and filtering a signal, performing impedance matching, modulation of a carrier wave signal using a baseband signal. Transmitter 100 in one embodiment can be an oscillator based transmitter such as a super heterodyne transmitter.

Signal processing circuit 210 of receiver 200 in one embodiment can include a combination of analog signal processing circuitry and digital signal processing circuitry. Signal processing circuit 210 of receiver 200 can perform one or more signal processing function such as amplification of a received radiofrequency signal, filtering, down conversion for recovery of a baseband signal and demodulation of baseband signal for recovery of a digital bitstream. Receiver 200 in one embodiment can be an oscillator based receiver such as a super heterodyne receiver.

As set forth herein, radiofrequency signal transmission system 1000 in one embodiment can be configured so that signal processing circuit 110 of transmitter 100 for transmission of a signal can provide first and second streams. In one embodiment, signal processing circuit 110 of transmitter 100 can obtain an input digital bitstream, split the input digital bitstream into first and second digital bitstreams, e.g. a first digital bitstream having even bits of the input digital bitstream and a second digital bitstream having odd bits (or another separation scheme).

Signal processing circuit 110 of transmitter 100 can modulate a radiofrequency signal using the first digital bitstream to provide the first stream. Signal processing circuit 110 of transmitter 100 can modulate a radiofrequency signal using the second digital bitstream to provide the second stream. Signal processing circuit 110 can provide the first stream to have a first power level and can provide the second stream to have a second power level, wherein the second power level is lower than the first power level.

Signal processing circuit 110 of transmitter 100 can provide the first and second streams to have differentiated power levels. Transmitter 100 can transmit the first and second streams using first through Nth antennas 105A-105N and in one embodiment can transmit the first and second streams using a certain single antenna, e.g. antenna 105A.

Receiver 200 can receive a combined radiofrequency signal having a combination of the first and second streams that are transmitted by transmitter 100. Receiver 200 can receive the combined radiofrequency signal using first through Nth receiver antennas 205A-205N. In one embodiment, receiver 200 can receive the combined radiofrequency signal having the first and second streams transmitted by transmitter 100 using a single certain antenna, e.g. antenna 205A. Signal processing circuit 210 of receiver 200 can process the combined radiofrequency signal to recover the first digital bitstream. Signal processing circuit 210 of receiver 200 can process the combined radiofrequency signal to recover the second digital bitstream and can assemble the first bitstream and the second bitstream to recover the input digital bitstream.

Figure 2:
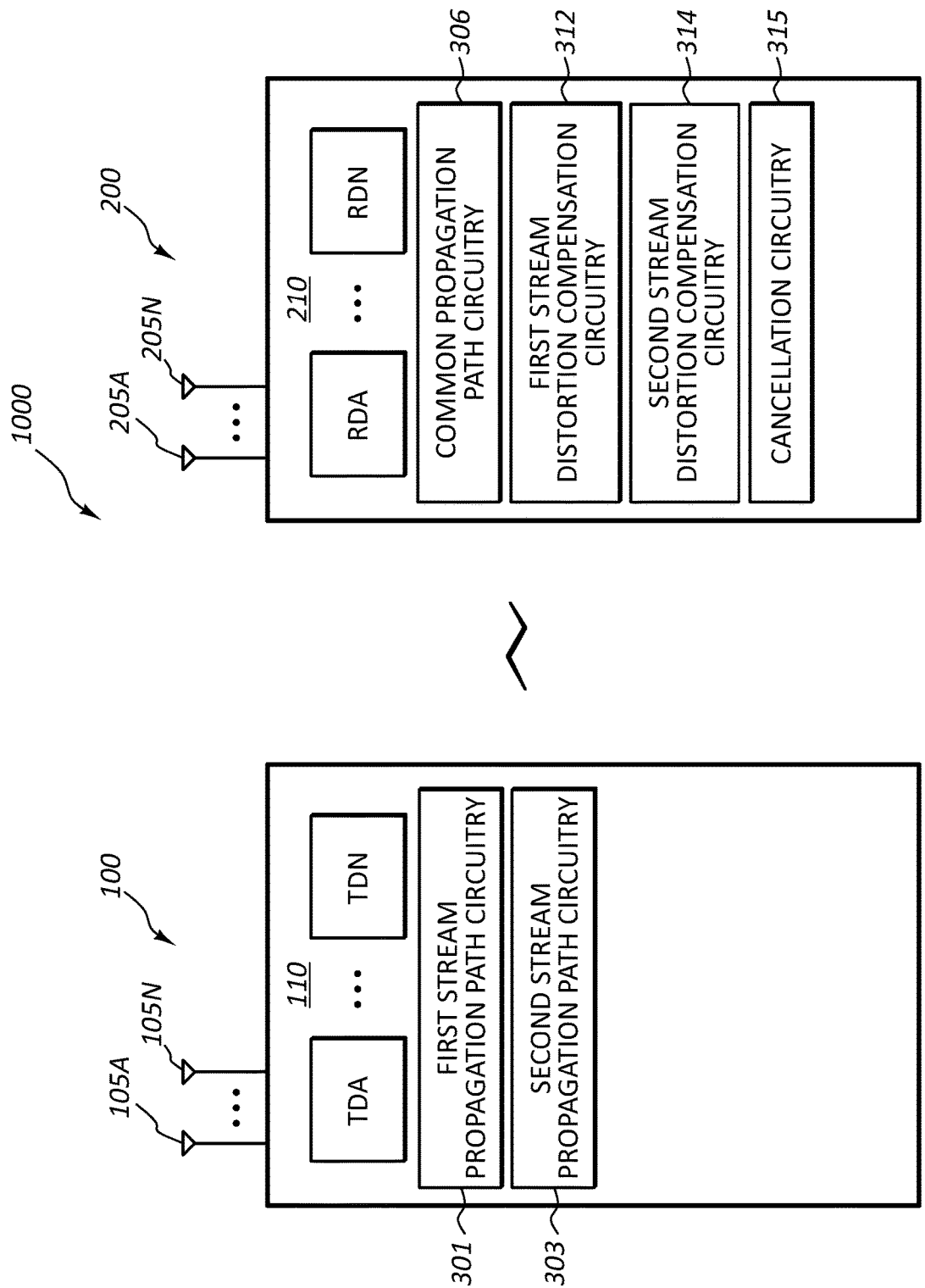
FIG. 2 is a functional block diagram of a radiofrequency signal transmission system having a transmitter and a receiver according to one embodiment.

A functional schematic diagram of radiofrequency signal transmission system 1000, having transmitter 100 and receiver 200 is shown in FIG. 2. Signal processing circuit 110 of transmitter 100 can include first through Nth transmitter distortion sources, e.g. TDA-TDN. One source of transmitter distortion can be a transmitter amplifier, while other sources of distortion of transmitter signal processing circuit can include, e.g. transmitter modulator circuitry, transmitter encoder circuitry, transmitter signal conditioning circuitry, and remaining circuitry of transmitter RF circuitry. Sources of transmitter distortion can also include one or more transmitter antenna.

Signal processing circuit 110 of transmitter 100 can include first stream propagation path circuitry 301 and a second stream propagation path circuitry 303. First stream propagation path circuitry 301 defines the circuitry of transmitter 100 used for the propagation of the first stream within transmitter 100. Second stream propagation path circuitry 303 of transmitter 100 defines the circuitry for propagation of the second stream within transmitter 100. In some embodiments, first stream propagation path circuitry 301 and second stream propagation path circuitry 303 can include different distortion sources of first through Nth transmitter distortion sources TDA-TDN. For example, first stream propagation path circuitry 301 can include a first set of distortion sources TDA-TDN and second stream propagation path circuitry 303 can include a second set of sources of distortion sources TDA-TDN, and there may be no overlap between the first set of distortion sources and the second set of distortion sources. In another embodiment, first stream propagation path circuitry 301 and second stream propagation path circuitry 303 can share distortion sources of the first through Nth distortion sources, TDA-TDN of signal processing circuit 110 of transmitter 100.

Signal processing circuit 210 of receiver 200 can include first through Nth receiver distortion sources RDA-RDN, common propagation path circuitry 306, first stream distortion compensation circuitry 312, second stream distortion compensation circuitry 314, and cancellation circuitry 315. Common propagation path circuitry 306 of receiver 200 can commonly define first stream propagation path circuitry and second propagation path circuitry of receiver 200. Common propagation path circuitry 306 can include common processing circuitry 1201.

First stream distortion compensation circuitry 312 can compensate for distortion of the first stream by circuitry of first stream propagation path circuitry 301 of transmitter 100 and and/or circuitry of the first stream propagation path circuitry of receiver 200 defined by common propagation path circuitry 306 of receiver 200. First stream distortion compensation circuitry 312 for performance of distortion compensation can use one or more model of one or more transmitter distortion source TDA-TDN of transmitter 100 and/or one or more model of one or more receiver distortion source RDA-RDN of receiver 200.

Second stream distortion compensation circuitry 314 can compensate for distortion of the second stream by circuitry of second stream propagation path circuitry 303 of transmitter 100 and and/or circuitry of the second stream propagation path circuitry of receiver 200 defined by common propagation path circuitry 306 of receiver 200. Second stream distortion compensation circuitry 314 for performance of distortion compensation can use one or more model of one or more transmitter distortion source TDA-TDN of transmitter 100 and/or one or more model of one or more receiver distortion source RDA-RDN of receiver 200.

Receiver 200 can obtain a combined radiofrequency signal comprising the second stream combined with the first stream e.g. superimposed on the first stream. Receiver 200 for performing obtaining of a combined radiofrequency signal can pick up a combined radiofrequency signal on one or more antenna thereof. Signal processing circuit 210 of receiver 200 can provide the combined radiofrequency signal to first stream distortion compensation circuitry 312. For providing a combined radiofrequency signal to first stream distortion compensation circuitry 312 receiver 200 can process the combined radiofrequency signal (e.g. subject to the combined radiofrequency signal to filtering, down conversion to recover a baseband signal, and/or amplification). First stream distortion compensation circuitry 312 can recover the first stream and the first digital bitstream based on the power level of the first stream being greater than the power level of the second stream.

Cancellation circuitry 315 of receiver 200 can cancel (e.g. entirely or partially) a contribution of the first stream to the combined radiofrequency signal. For operation, cancellation circuitry 315 can use the first digital bitstream recovered by the first stream distortion compensation circuitry 312 to reconstruct the contribution of the first stream to the combined radiofrequency signal. Cancellation circuitry 315 can feed an output thereof to summing circuitry 1215 for cancellation of a contribution of the first stream from the combined radiofrequency signal.

Signal processing circuit 210 of receiver 200 can provide the combined radiofrequency signal to the summing circuitry 1215 for cancellation of the contribution of the first stream and signal processing circuit 210 can provide the processed combined radiofrequency signal having the first stream cancelled from the combined radiofrequency signal to second stream distortion compensation circuitry 314. Second stream distortion compensation circuitry 314 can recover the second stream and the second digital bitstream based on the contribution of the first stream being cancelled from the combined radiofrequency signal.

Figure 3:
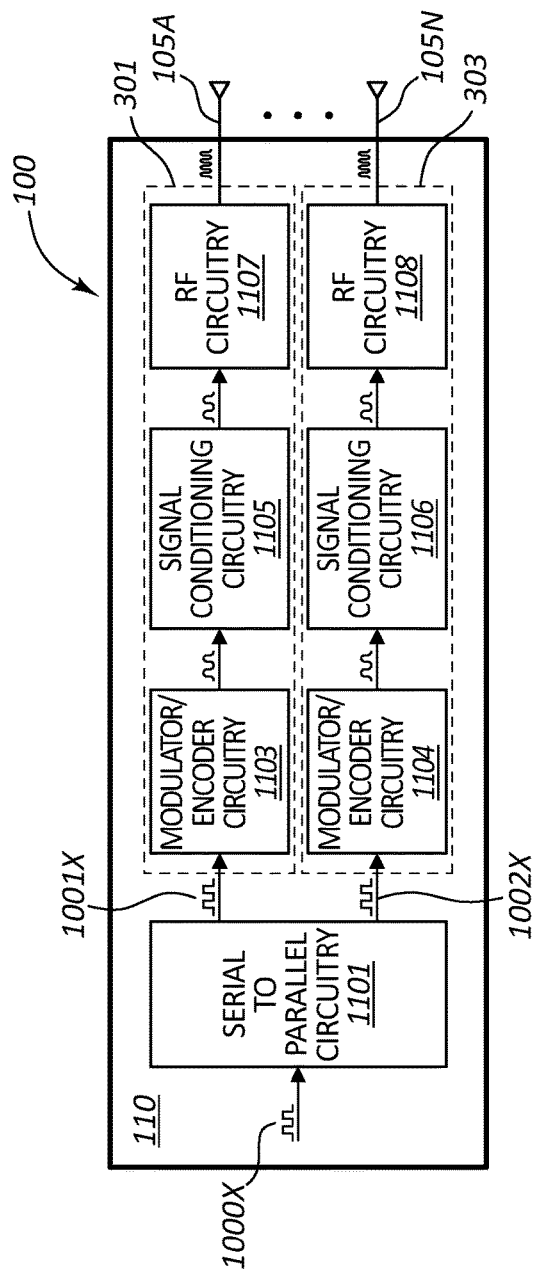
FIG. 3 is a processing flow block diagram of a radiofrequency signal transmitter according to one embodiment.

FIG. 3 is a schematic diagram illustrating propagation of signals within transmitter 100 in one embodiment. Signal processing circuit 110 of transmitter 100 can include serial to parallel circuitry 1101, modulator/encoder circuitry 1103, signal conditioning circuitry 1105, RF circuitry 1107, modulator/encoder circuitry 1104, signal conditioning circuitry 1106, and RF circuitry 1108. Modulator/encoder circuitry 1103, signal conditioning circuitry 1105, and RF circuitry 1107 in one embodiment can define first stream propagation path circuitry 301 as explained in reference to FIG. 2. Modulator/encoder circuitry 1104, signal conditioning circuitry 1106, and RF circuitry 1108 in one embodiment can define second stream propagation path circuitry 303 as described in connection with FIG. 2.

Referring to signal processing circuit 110 of transmitter 100 as set forth in FIG. 3, signal processing circuit 110 can obtain original digital bitstream 1000X and input the original digital bitstream 1000X into serial to parallel circuitry 1101, which can split the original digital bitstream 1000X into first digital bitstream 1001X and second digital bitstream 1002X. Signal processing circuit 110 can feed the first digital bitstream 1001X to first stream propagation path circuitry 301 and can feed second digital bitstream 1002X to second stream propagation path circuitry 303.

Modulator/encoder circuitry 1103 can include modulator circuitry to perform modulation of first digital bitstream 1001X. For example, modulator/encoder circuitry 1103 can include modulator circuitry to perform digital modulation, e.g. by quadrature amplitude modulation or phase shift keying modulation. For performing modulation modulator circuitry of modulator/encoder circuitry 1103 can translate bits of first digital bitstream 1001X into points of a constellation diagram, in which symbols defined by a series of bits are represented by complex numbers. Modulator/encoder circuitry 1103 can also include encoder circuitry for encoding error correction bits. Modulator/encoder circuitry 1103 can provide a baseband signal with real and imaginary parts of symbols provided on the constellation diagram. The baseband signal output by modulator/encoder circuitry 1103 can be processed by signal conditioning circuitry 1105. Signal conditioning circuitry 1105 can provide such functions, e.g. as digital to analog conversion, predistortion, pulse shaping, and/or combining (at baseband). Signal conditioning circuitry 1105 can include e.g. one or more of a digital to analog converter, a predistortion circuit, a pulse shaping circuit, and/or a combiner circuit (at baseband).

Signal conditioning circuitry 1105, on conditioning of a baseband signal, can input the baseband signal to RF circuitry 1107. RF circuitry 1107 can upconvert the baseband signal by modulation of a carrier wave using the baseband signal. RF circuitry 1107 can transmit the upconverted signal for emission by antenna 105A. RF circuitry 1107 can perform various functions such as, e.g., power amplification, up-conversion (baseband to passband), and/or combining (e.g. at intermediate frequency IF or RF). RF circuitry 1107 can include one or more of e.g. a power amplifier, an up-converter (baseband to passband), and/or a combiner circuit (at intermediate frequency IF or RF).

With respect to second digital bitstream 1002X, modulator/encoder circuitry 1104, signal conditioning circuitry 1106, and RF circuitry 1108 can provide with respect to second digital bitstream 1002X, the functions as described with reference to modulator/encoder circuitry 1103, signal conditioning circuitry 1105, and RF circuitry 1107 with respect to first digital bitstream 1001X. RF circuitry 1108 can transmit an upconverted baseband signal for emission by antenna 105N.

In the embodiment described with reference to FIG. 3 modulator/encoder circuitry 1103 and 1104 and signal conditioning circuitry 1105 and 1106 can operate in the digital domain and can forward a digital domain baseband signal to RF circuitry 1107 and 1108 operating in the analog domain, respectively. In another embodiment modulator/encoder circuitry 1103 and modulator/encoder circuitry 1104 as well as signal conditioning circuitry 1105 and signal conditioning circuitry 1106 can operate in the analog domain. First through Nth distortion sources TDA-TDN can include digital domain and/or analog domain distortion sources. First through Nth distortion sources RDA-RDN can include digital domain and/or analog domain distortion sources. In the embodiment of FIG. 3, first stream propagation path circuitry 301 and second stream propagation path circuitry 303 can include separate circuitry, e.g. in the embodiment of FIG. 3, can be absent of shared components between first stream propagation path circuitry 301 and second stream propagation path circuitry 303.

Figure 4:
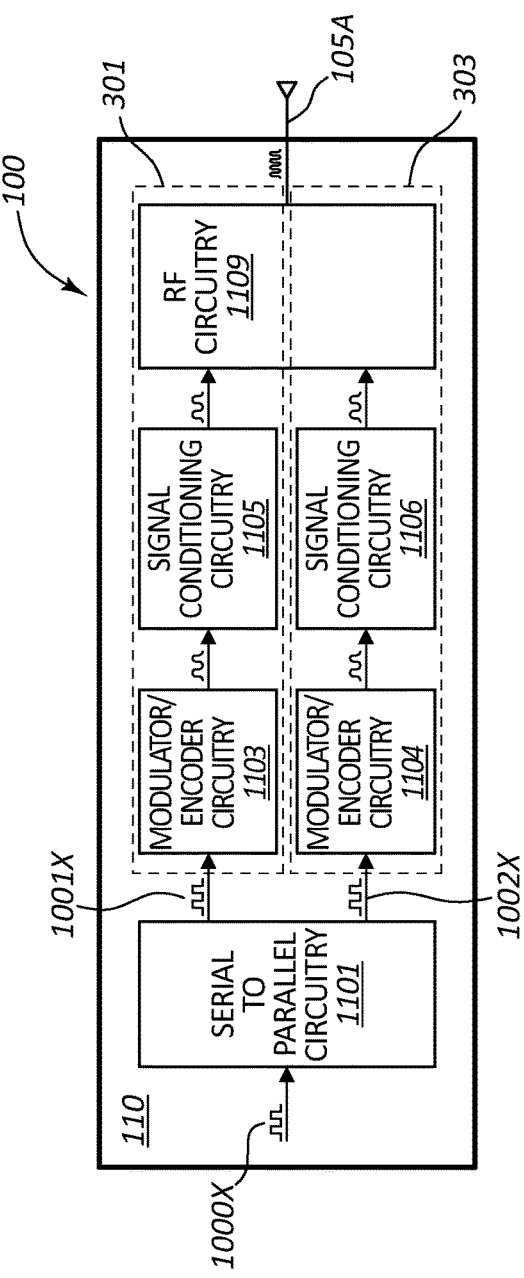
FIG. 4 is a processing flow block diagram of a radiofrequency signal transmitter according to one embodiment.

In the embodiment of FIG. 4, first stream propagation path circuitry 301 and second stream propagation path circuitry 303 can include shared components including shared components of RF circuitry 1109 as shown in FIG. 4. In FIG. 4, signal processing circuit 110 of transmitter 100 can include processing circuitry according to processing circuitry of signal processing circuit 110 as shown in the embodiment of FIG. 3, except with respect to RF circuitry 1109 which, as shown in FIG. 4, can include components shared between first stream propagation path circuitry 301 and second stream propagation path circuitry 303. Further, in the embodiment of FIG. 4 transmitter 100 can include a certain antenna, namely antenna 105A, that is shared between first stream propagation path circuitry 301 and second stream propagation path circuitry 303. In the embodiment of FIG. 3, transmitter 100 can emit first and second streams separately and the streams can be combined by interfering pickup of the streams at one or more receiver antenna. In the embodiment of FIG. 4, the first and second streams can be combined in the upconverted stage prior to antenna emission by the transmitter. In another embodiment, the first and second streams can be combined at the transmitter baseband stage prior to upconversion by the transmitter.

Figure 5:
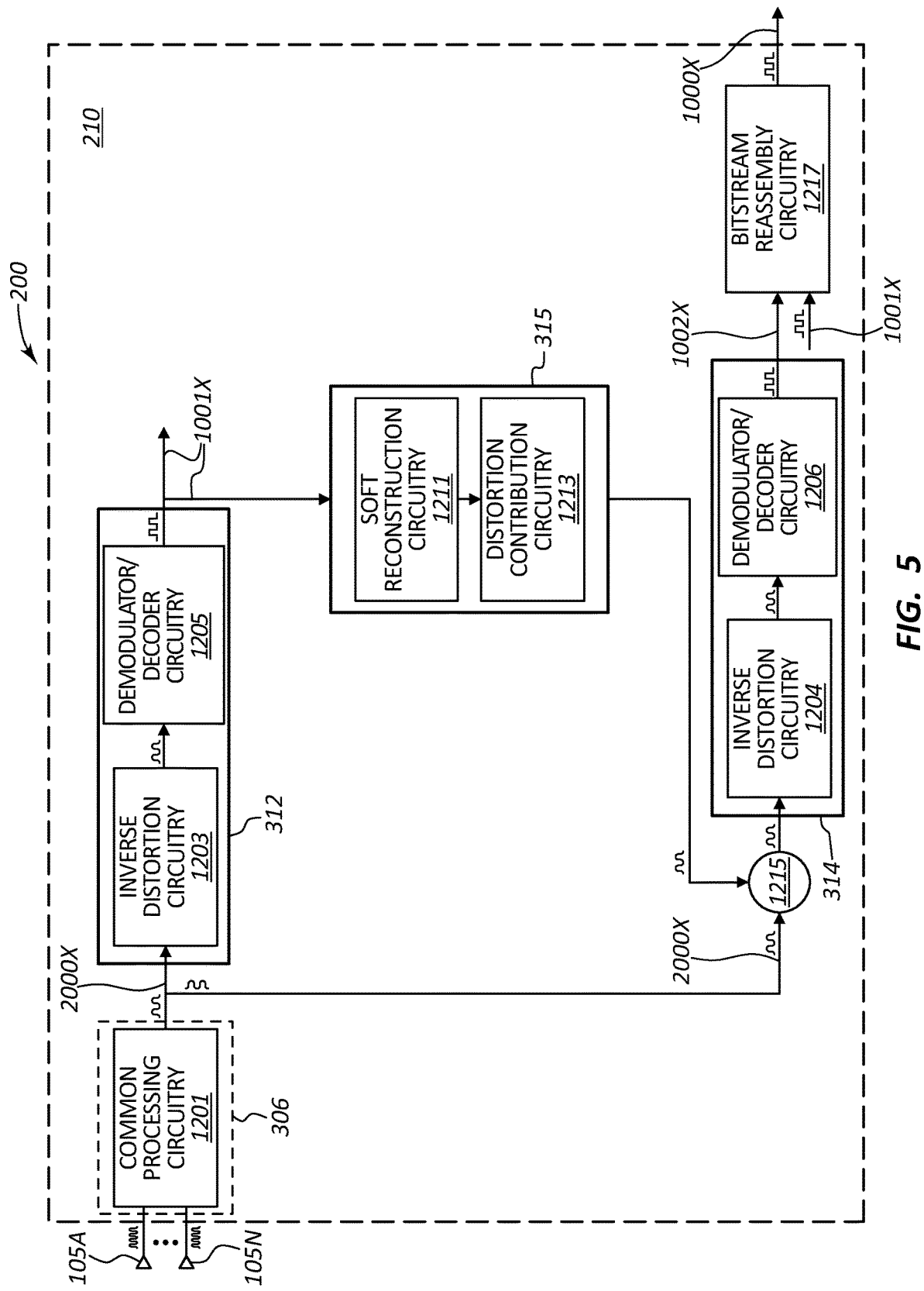
FIG. 5 is a processing flow block diagram of a radiofrequency signal receiver according to one embodiment.

FIG. 5 illustrates a flow schematic diagram of receiver 200 having signal processing circuit 210 in one embodiment. Receiver 200 can include first through Nth antennas 105A-105N and in one embodiment can include a single antenna, e.g. antenna 105A. The first through Nth antennas 105A-105N can be in wireline communication with common processing circuitry 1201 which processes radio frequency signals picked up by the first through Nth antennas 105A-105N. Common processing circuitry 1201 can include such components as an amplifier and down conversion circuitry to recover a baseband signal from a combined radiofrequency signal picked up by first through Nth antennas 105A-150N.

Signal processing circuit 210 can forward an output of common processing circuitry 1201 to first stream distortion compensation circuitry 312. An output of common processing circuitry 1201 can include a combined radio frequency signal 2000X comprising a combination of a first stream provided by first stream propagation path circuitry 301 of transmitter 100 and a second stream provided by second stream propagation path circuitry 303 of transmitter 100. Common processing circuitry 1201 can perform such functions e.g. as low noise amplification, automatic gain control, down-conversion (passband to baseband), and/or analog to digital conversion. Common processing circuitry 1201 can include one or more of, e.g. a low noise amplifier (LNA), and automatic gain control (AGC) circuit, a down-conversion circuit (passband to baseband), and/or an analog to digital converter (ADC).

As noted with reference to the functional schematic diagram of FIG. 2, a first stream distortion compensation circuitry 312 can recover the first digital bitstream 1001X based on a processing that is in dependence on a power level differential between the first stream propagated by first stream propagation path circuitry 301 and a second stream propagated by second stream propagation path circuitry 303 of transmitter 100. Embodiments herein recognize that where a power level of a first stream and a second stream are sufficiently differentiated, the first digital bitstream can be recovered by processing of a combined radiofrequency having the first stream and the second stream. Bitstream recovery can be enhanced with use of distortion compensation for compensation of distortion of the first stream.

First stream distortion compensation circuitry 312 for recovery of a first digital bitstream 1001X can include inverse distortion circuitry 1203, and demodulator/decoder circuitry 1205. Inverse distortion circuitry 1203 can employ models of distortion sources TDA-TDN and/or distortion sources RDA-RDN to correct (e.g. partially or entirely) for distortion attributable to distortion sources of distortion sources TDA-TDN and/or distortion sources RDA-RDN. Signal processing circuit 210 of receiver 200 can feed an output of inverse distortion circuitry 1203 to demodulator/decoder circuitry 1205. Demodulator/decoder circuitry 1205 can include demodulator circuitry to translate a distortion corrected baseband signal into symbol constellation points provided by modulator/encoder circuitry 1103 of transmitter 100. Demodulator/decoder circuitry 1205 can include decoder circuitry to remove error correction bits for recovery first digital bitstream 1001X. Demodulator/decoder circuitry 1205 can output recovered first digital bitstream 1001X, which first digital bitstream 1001X can be forwarded to cancellation circuitry 315 which can use the information of the recovered first digital bitstream 1001X to recreate a contribution of the first stream to combined radiofrequency signal 2000X.

Soft reconstruction circuitry 1211 of cancellation circuitry 315 can modulate the recovered first digital bitstream 1001X to output a reconstructed radiofrequency signal which can be subject to distortion by distortion contribution circuitry 1213. Soft reconstruction circuitry 1211 according to one embodiment perform the function of modulator/encoder circuitry 1103 of signal processing circuit 110 of transmitter 100. Distortion contribution circuitry 1213 can apply a distortion to a reconstructed baseband signal output by soft reconstruction circuitry 1211 so that cancellation circuitry 315 provides a distorted baseband signal having a distortion in accordance with a distortion of a first stream contribution to combined radiofrequency signal 2000X.

Cancellation circuitry 315 can provide a reconstructed first stream contribution to combined radiofrequency signal 2000X (with distortion applied) to summing circuitry 1215 by cancellation circuitry 315. Summing circuitry 1215 can subtract the reconstructed first stream reconstructed using cancellation circuitry 315 from combined radiofrequency signal 2000X output by common processing circuitry 1201. Summing circuitry 1215 can cancel a contribution of a first stream to combined radiofrequency signal 2000X using the reconstructed first stream contribution and can output the combined radiofrequency signal (now subject to first stream cancellation) to second stream distortion compensation circuitry 314.

Second stream distortion compensation circuitry 314 can include inverse distortion circuitry 1204 and demodulator/decoder circuitry 1206. Inverse distortion circuitry 1204 can correct, e.g. partially or entirely, for distortion of a second stream attributable to one or more distortion sources of distortion sources TDA-TDN and/or distortion sources RDA-RDN. Inverse distortion circuitry 1204 can employ models, e.g. power dependent models that model performance of one or more distortion sources of distortion sources TDA-TDN and/or distortion sources RDA-RDN. Signal processing circuit 210 of receiver 200 can feed an output of inverse distortion circuitry 1204 to demodulator/decoder circuitry 1206. Demodulator/decoder circuitry 1206 can include demodulator circuitry to translate a distortion corrected baseband signal into symbol constellation points provided by modulator/encoder circuitry 1104 of transmitter 100. Demodulator/decoder circuitry 1206 can include decoder circuitry to remove error correction bits for recovery of second digital bitstream 1002X. Demodulator/decoder circuitry 1206 can output a recovered second digital bitstream 1002X.

Bitstream reassembly circuitry 1217 can process second digital bitstream 1002X and first digital bitstream 1001X output by demodulator/decoder circuitry 1205 to provide recovered original digital bitstream 1000X.

Referring to signal processing circuit 110 as shown in FIGS. 1-4, signal processing circuit 110 can transmit through one or more of first through Nth antennas 105A-105N a first stream and a second stream at differentiated power levels in a common bandwidth.

The first stream transmitted by transmitter 100 and received by receiver 200 can occupy a certain bandwidth. The second stream transmitted by transmitter 100 and received by receiver 200 can also occupy that certain bandwidth. In one embodiment, the first stream can interfere with the second stream and the second stream can interfere with the first stream.

Transmitting and receiving the first stream and the second stream so that the first stream and the second stream occupy a common bandwidth can facilitate efficient usage of bandwidth allocation. Radiofrequency signal transmission system 1000 can be used to transmit radiofrequency signals in millimeter wave frequency bands using a compact multiantenna (aperture array) and in one embodiment, a single antenna configuration wherein each of a transmitter 100 and receiver 200 includes a single antenna. Radiofrequency signal transmission system 1000 configured as described can facilitate data rates approaching 100 Gbps or higher.

In one embodiment, radio signal transmission system 1000 can facilitate data rates of 20 Gbps or higher. In one embodiment, radio signal transmission system 1000 can facilitate data rates of 30 Gbps or higher. In one embodiment, radio signal transmission system 1000 can facilitate data rates of 40 Gbps or higher. In one embodiment, radio signal transmission system 1000 can facilitate data rates of 50 Gbps or higher. In one embodiment, radio signal transmission system 1000 can facilitate data rates of 60 Gbps or higher. In one embodiment, radio signal transmission system 1000 can facilitate data rates of 70 Gbps or higher. In one embodiment, radio signal transmission system 1000 can facilitate data rates of 80 Gbps or higher. In one embodiment, radio signal transmission system 1000 can facilitate data rates of 90 Gbps or higher. In one embodiment, radio signal transmission system 1000 can facilitate data rates of 100 Gbps or higher. Where radiofrequency signal transmission system 1000 uses multiple transmitter and/or receiver antennas the configuration of radiofrequency signal transmission system 1000 facilitates reduced spacing constraints for antennas of an antenna array and in one embodiment can facilitate usage of a single antenna of a transmitter 100 and/or receiver 200. Accordingly, in one embodiment transmitter 100 and/or receiver 200 can be provided to include only a single antenna.

In one embodiment, receiver 200 can include cancellation circuitry 315 and can be absent of first stream distortion compensation circuitry 312 and/or second stream distortion compensation circuitry 314. In such an embodiment, receiver 200 can provide recovery of an original digital bitstream using cancellation circuitry 315 without using one or more of first stream distortion compensation circuitry 312 or second stream distortion compensation circuitry 314. In one embodiment, receiver 200 can include one or more of first stream distortion compensation circuitry 312 or second stream distortion compensation circuitry 314 and can be absent of cancellation circuitry 315. In such an embodiment, receiver 200 can perform recovery of an original digital bitstream using one or more of first stream distortion compensation circuitry 312 or second stream distortion compensation circuitry 314 without usage of cancellation circuitry 315.

Figure 6:
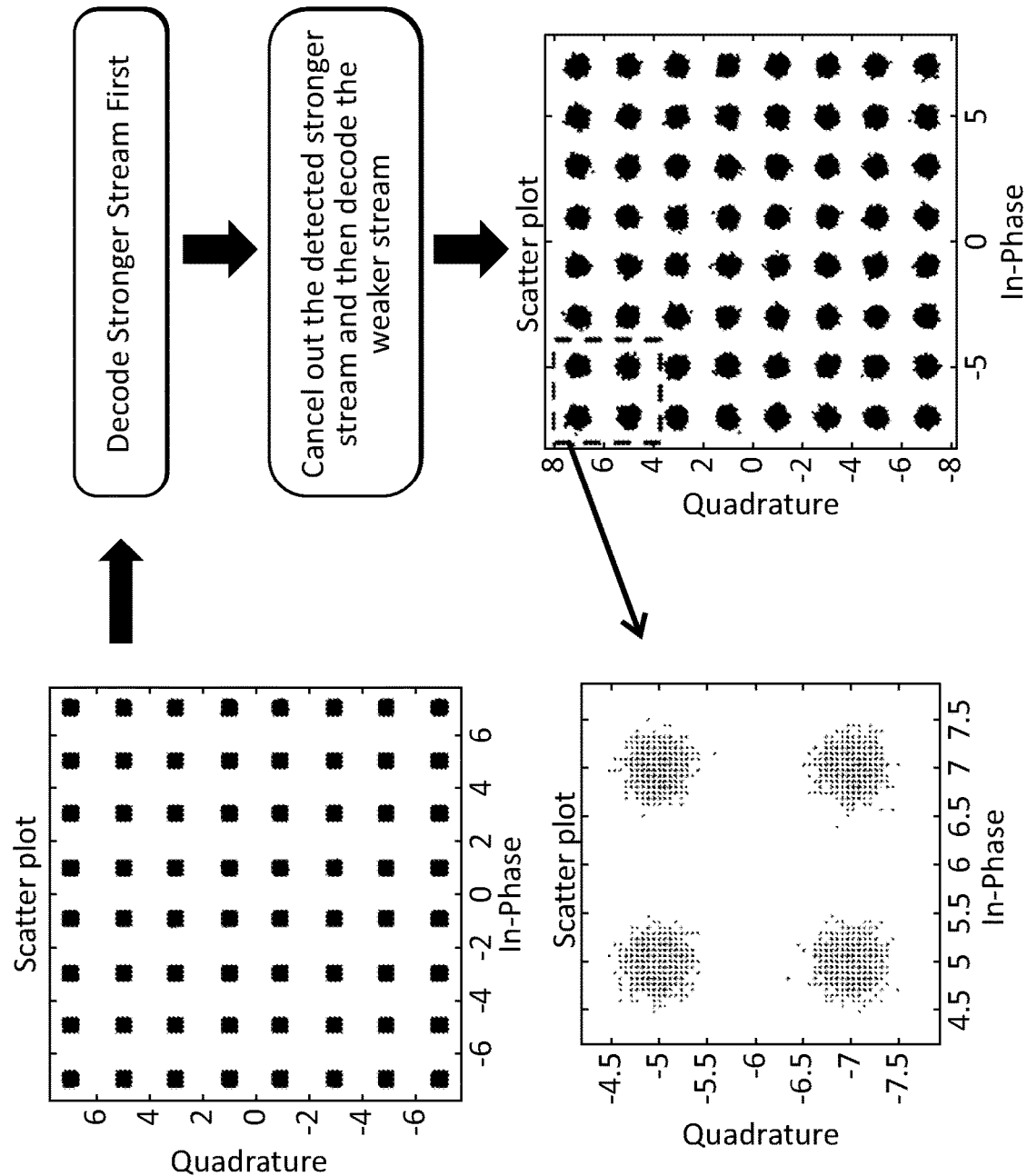
FIG. 6 is a schematic diagram illustrating recovery of a signal using power multiplexing according to one embodiment.

FIG. 6 schematically depicts detection of power multiplexed first and second streams. FIG. 6 illustrates detection of power multiplexed 64 quadrature amplitude modulation (64-QAM) streams in an illustrative use case wherein there is no signal dependent distortion. As set forth herein first and second streams can be transmitted respectively at first and second different power levels.

Assume that the SNR for weaker stream is 20 dB—that is, its average power is 20 dB above the additive white noise Gaussian noise (AWGN) noise power. Further, assume that the stronger stream is 20 dB above the weaker stream. The constellation plot in the upper left is the superposition of both streams. Now, since the stronger stream is 20 dB above the co-channel signal and 40 dB above noise, the stronger stream shows up as a clean 64-QAM stream in the superposed plot, which is representative of the received signal containing the two signals plus thermal noise. This means that the stronger stream can be detected without any special interference mitigation processing. Once the stronger signal is detected, it can be removed from the received signal. Removal of the stronger signal can include recovering a first digital bitstream of the first stream, performing soft reconstruction of the first stream using the first digital bitstream and subtracting the reconstructed first stream from the received signal. What remains in the "cleaned up" received signal is the weaker stream and thermal noise. This is shown in the constellation plot in the lower right. Once again, since the weaker stream has an SNR of 20 dB, it shows up as a fairly clean 64-QAM constellation. Note that the noise about each constellation point now appears as circularly symmetric Gaussian noise unlike the perturbation about the constellation points for the stronger signal, which was dominated by interference due to the weaker stream. Note that signal dependent distortion for this illustration has been disregarded but can be compensated for in one embodiment.

Before considering detection of power multiplexed streams in the presence of prohibitive distortion, derivation of power settings for the two streams in a distortion-free case can be provided. Power settings for first and second streams can be selected to optimize performance of radiofrequency signal transmission system 1000 for signal recovery.

To close the link for the stronger stream 1, $$SINR_1 = \frac{P_1}{P_2 + P_n} \geq SINR_0 \quad \text{(Eq. 1)}$$

Dividing the numerator and denominator of the LHS by noise power, $$\frac{SNR_1}{SNR_2 + 1} \geq SNR_0 \quad \text{(Eq. 2)}$$

$$SNR_1 \geq (SNR_2 + 1)SNR_0 \quad \text{(Eq. 3)}$$

To close the link for the weaker stream 2 (assuming perfect cancellation of stream 1), $$SNR_2 = SNR_2 \geq SNR_0$$

$$\Rightarrow \min(SNR_2) = SNR_0 \quad \text{(Eq. 4)}$$

In Eqs. 1-4, SINR refers to signal to interference plus noise ratio and SNR refers to signal to noise ratio. As set forth in Eqs. 1-4, power settings, including power differential settings, for a first stream and a second stream can be selected to achieve targeted signal recovery characteristics. To summarize the key results for power settings, there is set forth herein: The power differential between the two streams according to one embodiment can be established to be equal to the per-stream single input single output (SISO) equivalent "SISO equivalent". "SISO equivalent" refers to the transmission and reception mode in which it is assumed that one stream is being transmitted through a single antenna and received on a single antenna, though in practice additional antennas can be incorporated for increased data rates. Note that these are the minimum power settings. In practice, some margin can be built into the power settings.

Figure 7:
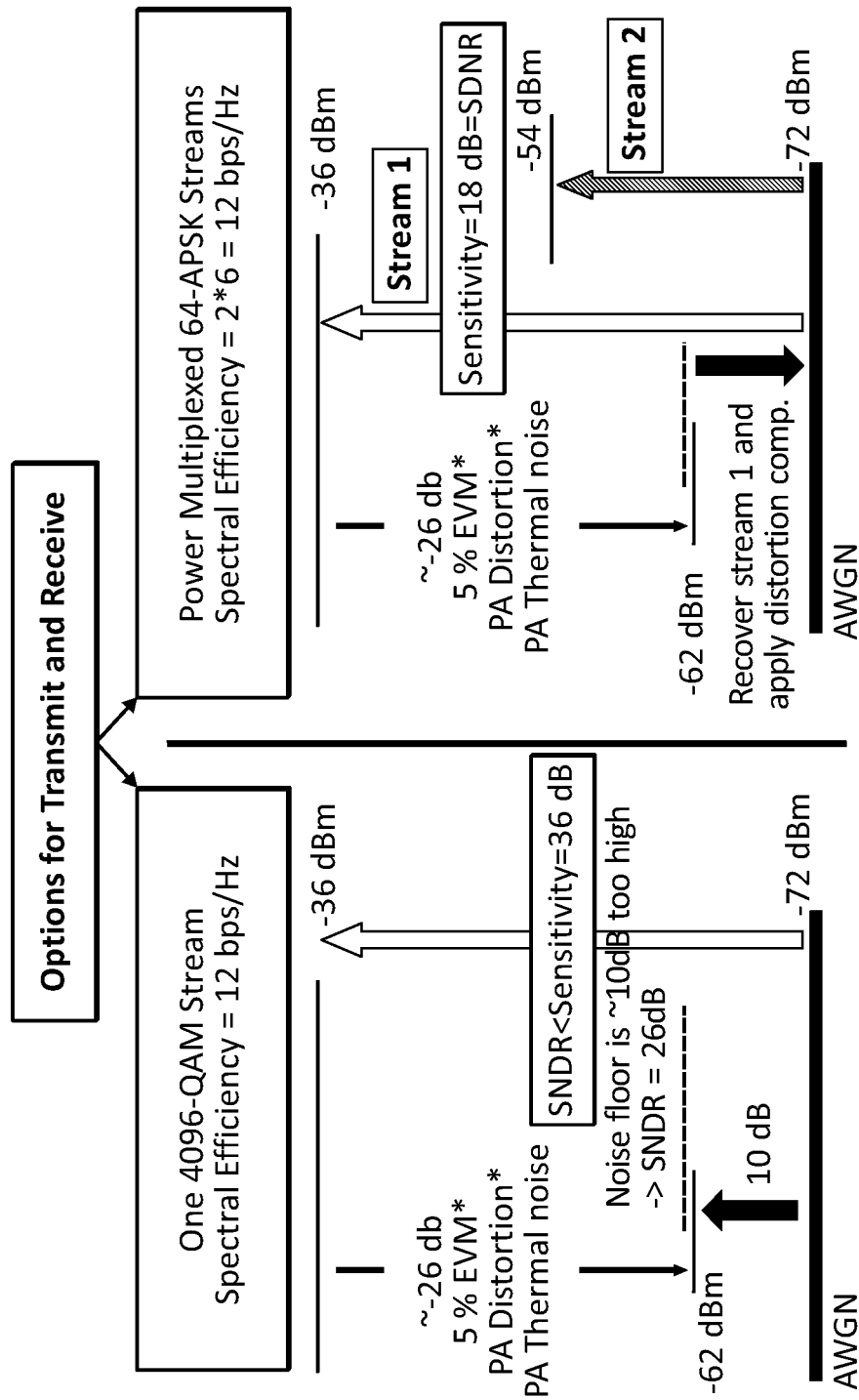
FIG. 7 is a chart illustrating performance of a power multiplexing signal recovery scheme according to one embodiment.

It is seen in FIG. 7 how a power multiplexed scheme (shown on the right) in the presence of distortion deliver data rates approaching or exceeding 100 Gbps using a SISO configuration.

On the left side of FIG. 7, there is depicted an alternate scheme according to one embodiment in which original bitstream 1000x is transmitted by modulation and encoding of a single stream using a 4096 quadrature amplitude (4096-QAM) modulation. Embodiments herein recognize that the described 4096-QAM (shown on the left) cannot deliver 100 Gbps. This is because a signal to noise plus distortion ratio (SNDR) of 36 dB is required but the actual available SNDR is limited to 26 dB due to the 5% EVM distortion in a considered embodiment. Embodiments herein recognize that for use of the left side scheme of FIG. 7 one has to use a lower density constellation whose sensitivity can be satisfied with a SNDR of 26 dB, resulting in a lower data rate of about 70 Gbps.

With power multiplexing on the other hand, there can be transmitted first and second 64 amplitude and phase shift keying (64-APSK) streams at first and second different power levels. Since 18 dB is the required SNR for a SISO system transmitting a 64-APSK stream, it is also adequate for the weaker stream since this stream is detected only after removal of the stronger stream and any associated distortion effects. Applying determined power differential settings, it is noted that that the stronger stream can be 18 dB stronger than the weaker stream. This means that the stronger stream can be 36 dB above thermal noise. From the power level diagram shown on the right, it can be seen that the stronger stream, even in the presence of noise and distortion and co-channel interference, meets the 18 dB sensitivity requirement. Accordingly, in the described example a full 6 bps/Hz can be achievable using the stronger stream.

For signal recovery a stronger stream can be removed from a combined signal (which is possible since the stronger signal can be detected, and hence, reconstructed for cancellation) and the isolated weaker stream can be subject to reduction of distortion by at least 10 dB. Depending on how much of the 5% EVM is signal dependent and reproducible 6 bps/Hz or greater using the second (weaker) stream can be achievable. If the distortion is sufficiently reproducible, 12 bps/Hz or greater can be achievable for the first and second streams combined according to one illustrative embodiment.

Radio receivers can handle noise and channel impairments, namely time varying fluctuations in the radio channel between the transmitter and the receiver, as well as multipath. Real world transmitters and receivers also introduce distortion effects that cause the signal to deviate from the ideal. As noted above, in the radiofrequency signal transmission system 1000 first and second streams can be transmitted, with stream 1 at a higher power than stream 2. Data rates can be improved by way of distortion compensation.

At the receiver, in order to extract stream 2, the receiver can model and recreate an estimate of stream 1, including any non-ideal distortion effects. Non-ideal system distortion effects can include e.g. component non-linearities, component non-ideal gain/phase response, and component phase noise. Distortion due to component non-linearity can be signal dependent.

Figure 9:
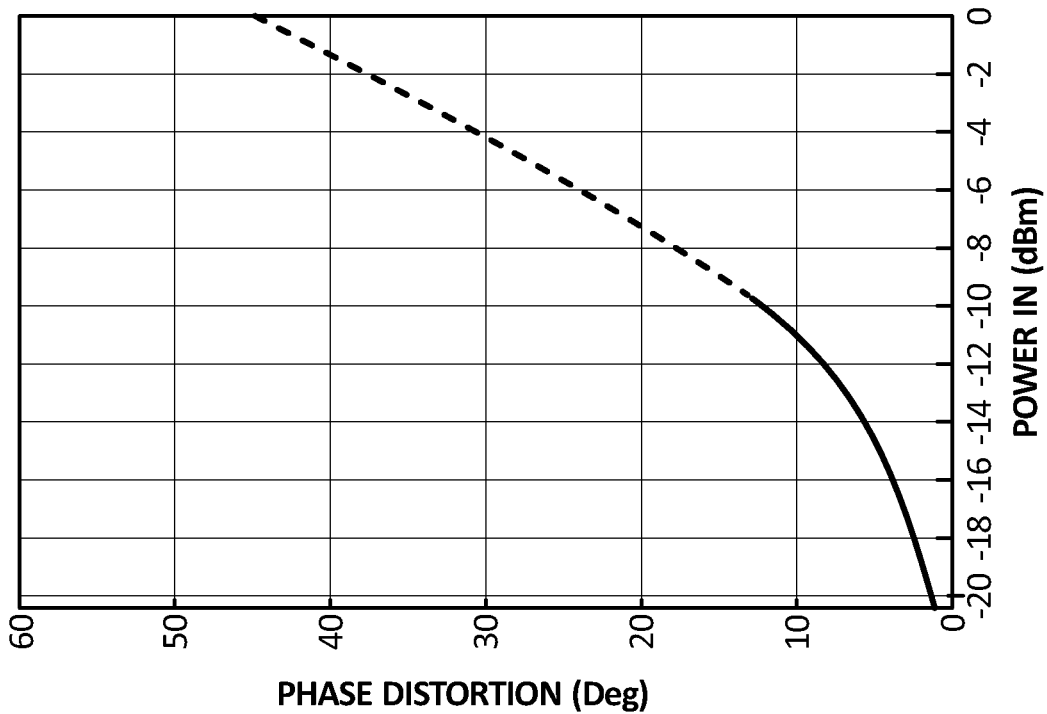
FIG. 9 is a response plot depicting illustrative phase distortion of an amplifier according to one embodiment.
Figure 8:
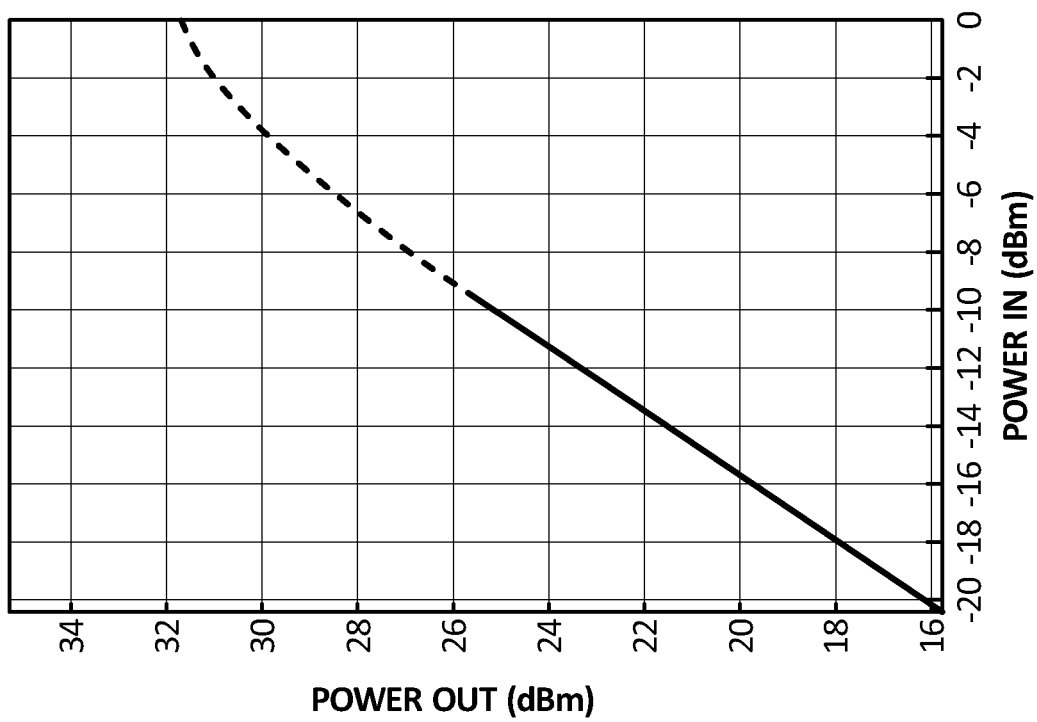
FIG. 8 is a response plot depicting illustrative power distortion of an amplifier according to one embodiment.

A solid state power amplifier (SSPA) can have a response generally as shown in FIGS. 8 and 9. In this plot, the mean power of the input signal is shown, and values populated by input signals are plotted with the solid curve. The response of FIG. 8 depicts the amplitude modulation to amplitude modulation (AM-AM) effect. The response of FIG. 9 depicts the amplitude modulation to phase modulation (AM-PM) effect and shows that phase can be distorted as a function of the amplitude of the input signal.

According to one embodiment, the AM-AM and AM-PM effects can be modeled using the Saleh model:

$$r_{out}(t) = \frac{\alpha_A r_{in}(t)}{1 + \beta_A r_{in}^2(t)} \quad \text{(Eq. 5)}$$

$$\phi_{out}(t) = \frac{\alpha_\phi r_{in}^2(t)}{1 + \beta_\phi r_{in}^2(t)} \quad \text{(Eq. 6)}$$

Where the complex baseband representation of the input signal to the amplifier is:

$$y_{in}(t) = r_{in}(t) e^{j\phi_{in}(t)} \quad \text{(Eq. 7)}$$

and the complex baseband representation of the amplifier output is:

$$y_{out}(t) = r_{out}(t) e^{j\phi_{out}(t)} \quad \text{(Eq. 8)}$$

For a given power amplifier (PA) values for the following distortion parameters provided by Saleh model coefficients can be returned using simulation analysis and/or circuitry performance analysis (e.g. including circuitry input and output signal analysis): $\alpha_A$, $\beta_A$, $\alpha_\phi$, and $\beta_\phi$. Because of the desire to operate in a power-efficient manner at the transmitter, it can be advantageous in some embodiments to set the mean power of stream 1 as close to the 1 dB compression point of the transmit amplifier as possible, meaning that some non-linear effects will be imparted to the signals. Depending on whether separate power amplifiers (PAs) are used for stream 1 and stream 2, or whether a single amplifier is used, these non-linear effects may be confined to stream 1, or may result in intermodulation products between stream 1 and stream 2.

According to one embodiment, the Ghorbani model can be used to model amplifier non-lineal effect distortion. According to one embodiment, the Rapp model can be used to model amplifier non-linear effect distortion. More generally a Volterra series can be used to model a non-linear system. Additional amplifier distortion attributes that can be subject to modeling can include amplifier non-ideal gain response, amplifier non-ideal phase response, and amplifier phase noise.

Distortion parameter values expressing distortion attributes of distortion sources of radiofrequency signal transmission system 1000 can be returned with use of simulation analysis and/or by circuitry performance analysis, e.g. including examination of circuitry input and output signals, wherein input and output signals are used as training signals for examination and return of distortion parameter values.

Simulation tools for use in performing simulation analysis can include can include the MATLAB® computing environment (MATLAB® is a registered trademark of The MathWorks, Inc.). Phase noise can be modeled using PhaseNoise object in the communications toolbox of the MATLAB® computing environment. Phase noise for a local oscillator can be modeled as −130 dBc/Hz at 1 MHz according to one embodiment. Modeled distortion response can be compensated for with use of distortion compensation circuitry disposed in receiver 200.

Signal processing circuit 110 of transmitter 100 can include first through Nth transmitter distortion sources, e.g. TDA-TDN. One source of transmitter distortion can be a transmitter amplifier, while other sources of distortion of transmitter signal processing circuit 110 can include, e.g. transmitter modulator circuitry, transmitter encoder circuitry, transmitter signal conditioning circuitry, and remaining circuitry of transmitter RF circuitry. Sources of transmitter distortion can also include one or more transmitter antenna. Signal processing circuit 210 of receiver 200 can include first through Nth receiver distortion sources, e.g. RDA-RDN. Sources of receiver distortion can include components of common processing circuitry 1201 and signal processing circuit 210 which can include e.g. an amplifier, automatic gain control circuitry, down-conversion (passband to baseband) circuitry, and/or analog to digital conversion circuitry. Sources of receiver distortion can also include one or more receiver antenna.

Distortion parameter values expressing distortion attributes for the noted transmitter distortion sources, TDA-TDN, and receiver distortion sources, RDA-RDN, can be returned with use of simulation analysis and/or by circuitry performance analysis, e.g. including examination of circuitry input and output signals, wherein input and output signals are used as training signals for examination and return of distortion parameter values.

Figure 10:
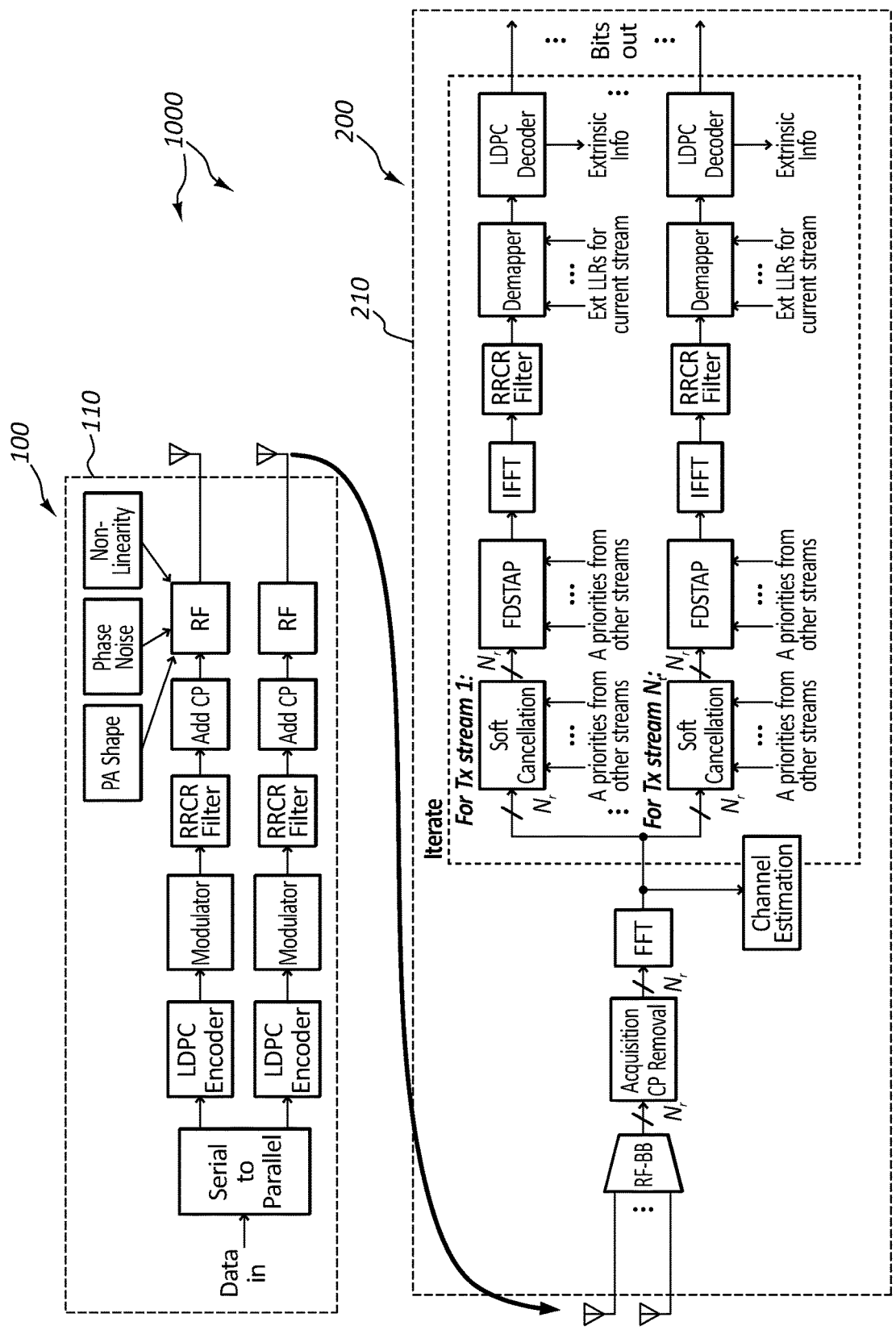
FIG. 10 is a processing flow block diagram of a radiofrequency signal transmission system having a transmitter and a receiver according to one embodiment.

FIG. 10 illustrates a radiofrequency signal transmission system 1000 having a transmitter 100 and receiver 200 according to one embodiment. Transmitter 100 can include a transmitter signal processing circuit 110 having a low density parity check code (LDPC) encoder. Receiver 200 can include a receiver signal processing circuit 210.

Figure 12:
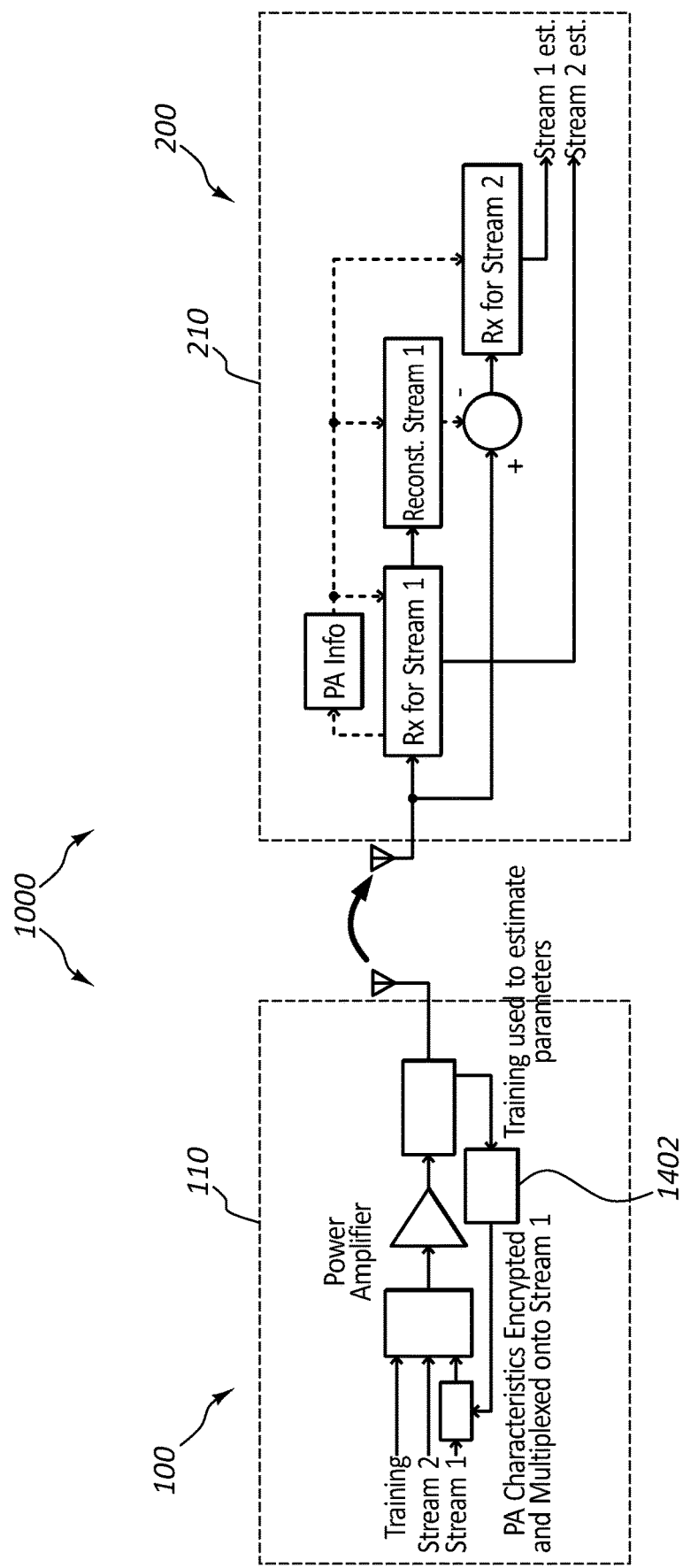
FIG. 12 is a processing flow block diagram of a radiofrequency signal transmission system having a transmitter and a receiver according to one embodiment.

Using power multiplexing as set forth herein data rates approaching or exceeding 100 Gbps can be achieved according to one embodiment wherein there are transmitted first and second 64-APSK streams per polarization over respective first and second antennas at a symbol rate close to 5 GS/s using a FEC with code rate close to 0.9. The configuration as shown in FIG. 12 can alternatively include a transmitter 100 that includes and uses a single antenna and a receiver 200 that includes and uses a single antenna.

FIG. 10 illustrates a receiver 200 featuring use of space time bit interleaved coded modulation (ST-BICM) with a single stream demapper (SSD) and soft cancellation (SC). Receiver 200 of FIG. 10 can be regarded as a space time bit interleaved single stream demapper soft cancellation (ST-BICM-SSD-SC) receiver. When using the ST-BICM-SSD-SC structure, illustrated in FIG. 10, an orthogonal frequency division multiplexing (OFDM) received signal can be reduced to a scalar channel for the demapper, for reduction of a number of operations for signal recovery.

For single carrier or multi-carrier waveforms, receiver 200 provided by an ST-BICM-SSD-SC structure as shown in FIG. 10 can address channels for which every transmitter-receiver pair has a different time dispersive channel, and is not limited to links for which the primary source of time dispersion is due to transmitter or receiver components.

The embodiment of FIG. 10 can feature frequency domain equalization (FDE), also known as circulant processing. In the embodiment of FIG. 10, each block of the transmitted single-carrier data can be prepended with a cyclic prefix. In accordance with the described embodiment, a frequency domain space time adaptive processor (FD-STAP) process can be computed and implemented using the Discrete Fourier Transform, typically implemented using the Fast Fourier Transform (FFT). According to one embodiment, an FDSTAP solution can be updated in every iteration for each transmitter.

Figure 11:
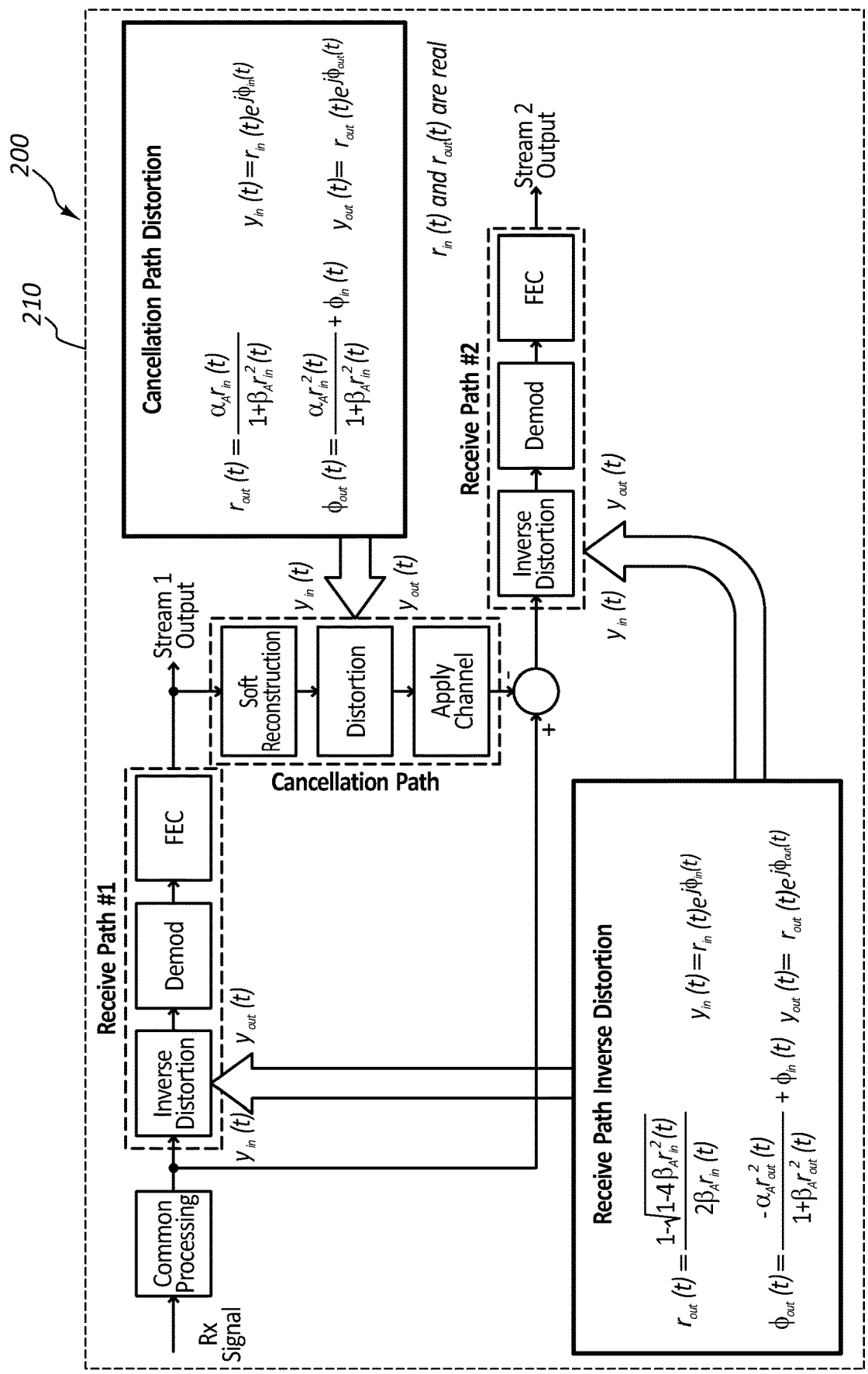
FIG. 11 is a processing flow block diagram of a radiofrequency signal receiver according to one embodiment.

FIG. 11 provides a conceptual view of distortion compensation in receiver 200. The embodiment of FIG. 11 can be configured to perform forward path inverse distortion and cancellation path distortion as illustrated in FIG. 11.

In accordance with forward path inverse distortion, the distortion parameter values provided by values for the coefficients $\alpha_A$, $\beta_A$, $\alpha_\phi$, and $\beta_\phi$ can be used in the receive path for stream 1 and stream 2 to invert the effect of the distortion at the transmit power amplifier. In the cancellation path, when reconstructing the waveform, the distortion characteristic can be re-applied to the re-constructed waveform as shown in FIG. 11. Distortion parameter values for remaining transmitter distortion sources TDA-TDN and receiver distortion sources RDA-RDN can also be returned and used for distortion compensation.

Distortion parameter values can be conveyed to receiver 200 of radiofrequency signal transmission system 1000 according to various methods. Distortion parameter values can be determined with use of simulation analysis and/or circuitry performance analysis. Distortion parameter values determined by circuitry performance analysis (e.g. circuitry input signal and output signal analysis) performed by receiver 200 according to one embodiment be returned at receiver 200 given a known training sequence; however, embodiments herein recognize that the parameter values according to such process can be estimated in the presence of noise, which limits the accuracy of the values. Alternatively, distortion parameter values can be returned at transmitter 100 by circuitry performance analysis (e.g. circuitry input signal and output signal analysis) performed by transmitter 100, as shown in FIG. 12, and conveyed to the receiver 200, either over a separate control channel or over stream 1, since detailed knowledge of the distortion parameter values is not typically required to estimate stream 1. The approach of FIG. 12 can use detector circuitry 1402 co-located at the transmitter 100, or other means of characterizing the power amplifier; however, this may already be available if the link is symmetric, or if the amplifier uses pre-distortion. In the embodiment of FIG. 12 transmitter 100 can include detector circuitry 1402 for detection of transmitter output signals which can be examined with transmitter input signals for return of distortion parameter values.

Another advantage of the approach in FIG. 12, is that the distortion parameters can be conveyed to the receiver 200 over an encrypted channel and to frustrate an attempt by an adversary to estimate the distortion parameter values, ensuring the conditional non-detectability of stream 2.

Figure 13:
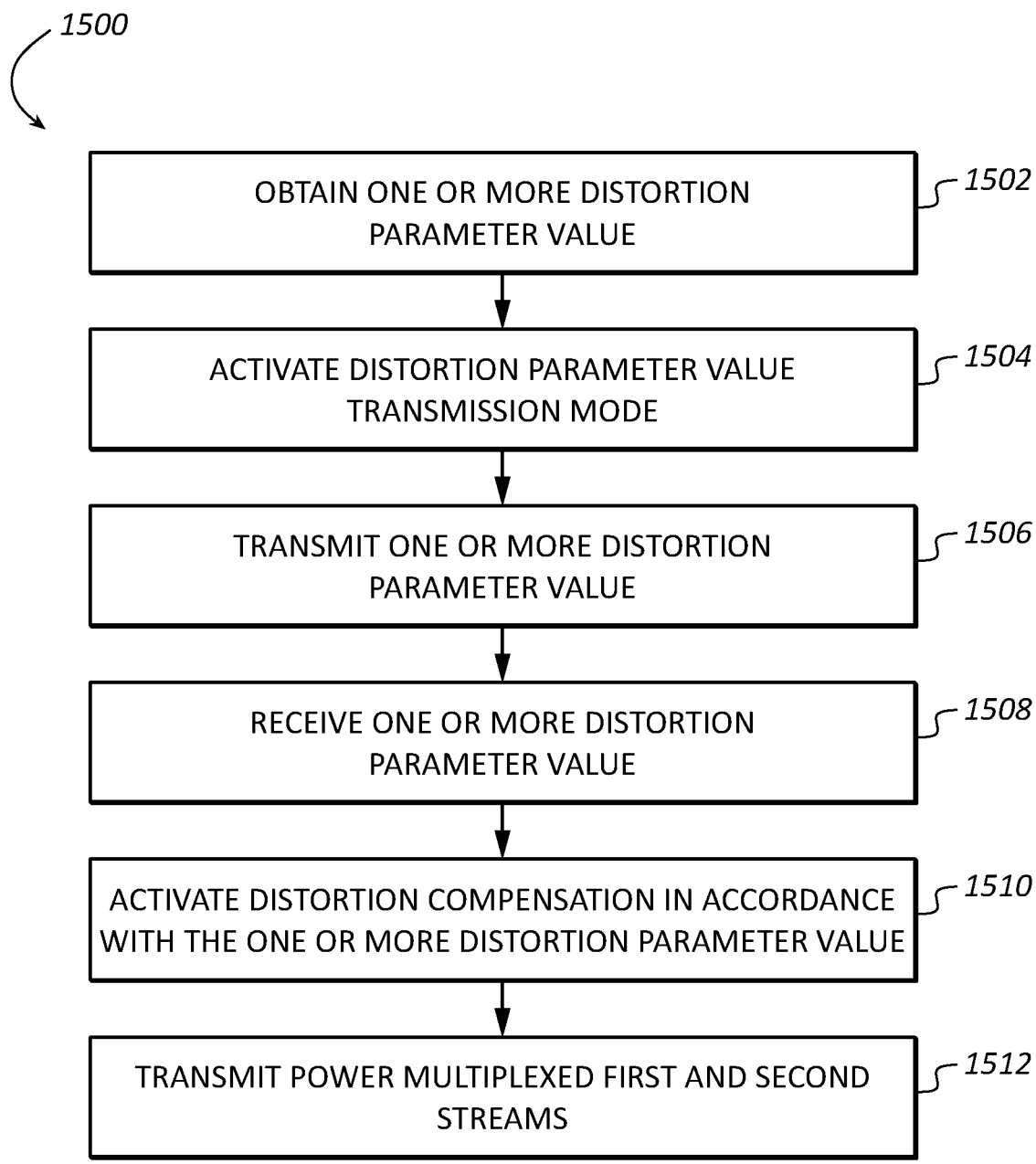
FIG. 13 is a flowchart depicting a method for performance by a radiofrequency signal transmission system according to one embodiment.

A method 1500 for performance by radiofrequency signal transmission system 1000 is described in reference to FIG. 13. At block 1502, radiofrequency signal transmission system 1000 can obtain one or more distortion parameter value. For example, radiofrequency signal transmission system 1000 can obtain one or more parameter value by simulation analysis and/or by circuitry performance analysis as depicted in FIG. 12 wherein circuitry input and output signals of radiofrequency signal transmission system 1000 can be examined for return of distortion parameter values.

At block 1504, radiofrequency signal transmission system 1000 can activate a distortion parameter value transmission mode. At block 1504 transmitter 100 can transmit the one or more distortion parameter value obtained at block 1502 to receiver 200. For activation of the distortion parameter value transmission mode at block 1504 according to one embodiment, transmitter 100 can activate an encryption process to encrypt distortion parameter values being transmitted. The activated encryption process can increase an encryption level relative to a previously active level, where the previously active encryption level is a zero encryption level or a nonzero encryption level.

For activation of the distortion parameter transmission mode at block 1504 according to one embodiment, transmitter 100 can deactivate stream 2 and can use only stream 1 for the transmission of the obtained distortion parameter values obtained at block 1502. Deactivating stream 2 simplifies recovery of stream 1 at receiver 200 and embodiments herein recognize that reduced data rates can be suitable for transmission of distortion parameter values.

At block 1506 with the distortion parameter value mode activated, transmitter 100 can transmit the one or more distortion parameter value obtained at block 1502. At block 1508 receiver 200 can receive the one or more distortion parameter value transmitted at block 1506. Receiver 200 can decode stream 1 for recovery of the one or more distortion parameter value. On receipt and decoding of the one or more distortion parameter value, receiver 200 can be informed that a distortion parameter value transmission mode has been activated and can responsively deactivate any distortion compensation currently active in receiver 200. Where a distortion parameter value transmission mode includes activating an encryption process, transmitter 100 prior to transmission of one or more distortion parameter to receiver 200 can transmit a distortion parameter value transmission mode indicating flag to receiver 200, which receiver 200 on decoding of the transmission mode indicating flag can activate an appropriate decryption process according the activated encryption process so that an ensuing encrypted one or more distortion parameter transmitted by transmitter 100 and received by receiver 200 is successfully decoded by receiver 200.

At block 1510 receiver 200 can activate distortion compensation in accordance with the one or more distortion parameter value received at block 1510. At block 1512 transmitter 100 can transmit power multiplexed first and second streams. At block 1512 transmitter 100 can deactivate the distortion parameter value transmission mode so that the second stream is activated. The transmitted power multiplexed first and second streams when received at receiver 200 can be subject to distortion compensation in accordance with the one or more distortion parameter value obtained at block 1502, transmitted at block 1506, and received at block 1508.

Radiofrequency signal transmission system 1000 can activate a distortion parameter value transmission mode at block e.g. on deployment of radiofrequency signal transmission system 1000 and thereafter for updating of distortion parameter values active for distortion compensation at predetermined or dynamically determined intervals, which can be e.g. hourly, daily, or monthly.

Embodiments herein recognize that current state of the art long range, 100 Gbps solutions require arrays composed of multiple antenna elements (at least, two) with large separation between the antennas (for example, several tens of meters for a 100 km link) and a separate pointing and steering (PAT) unit for each antenna element. For many deployment scenarios, this traditional approach poses various constraints: including (1) large spacing required between antennas may not be available, and (2) multiple antennas may not be available. Embodiments herein can avoid the described constraints while featuring advantages described herein.

One general aspect includes a method including: obtaining with a radiofrequency receiver a combined radiofrequency signal having a first stream combined with a second stream, where the first stream has a first power level, and where the second stream has a second power level, the first power level of the first stream being greater than the second power level of the second stream, where the radiofrequency receiver includes one or more antenna; processing the combined radiofrequency signal to recover a first digital bitstream associated to the first stream; and recovering a digital bitstream associated to the second stream using the first digital bitstream. Other embodiments of this aspect include corresponding computer systems, apparatus, and computer programs recorded on one or more computer storage devices, each configured to perform the actions of the methods.

Implementations may include one or more of the following features. The method where the first stream and the second stream occupy a common bandwidth. The method where the recovering a digital bitstream associated to the second stream includes cancelling a contribution of the first stream to the combined radiofrequency signal. The method where the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream. The method where the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream, and where the performing a reconstruction includes compensating for distortion by one or more distortion source using models of the one or more distortion source. The method where the processing the combined radiofrequency signal to recover a first digital bitstream includes compensating for distortion by one or more distortion source using models of the one or more distortion source. The method where the processing the combined radiofrequency signal to recover a first digital bitstream includes compensating for distortion by one or more distortion source of signal path propagation circuitry for propagating the first stream using models of the one or more distortion source, where the one or more distortion source includes an amplifier of a radiofrequency transmitter. The method where the recovering a digital bitstream associated to the second stream using the first digital bitstream, includes cancelling a contribution of the first stream to the combined radiofrequency signal, and compensating for distortion by one or more distortion source of signal path propagation circuitry for propagating the second stream using models of the one or more distortion sources. The method where the obtaining with a radiofrequency receiver a combined radiofrequency signal includes picking up the combined radiofrequency signal with a single antenna of the radiofrequency receiver. The method where radiofrequency receiver includes a single antenna, where the obtaining with a radiofrequency receiver a combined radiofrequency signal includes picking up the combined radiofrequency signal with the single antenna of the radiofrequency receiver. The method where the method includes transmitting with a radiofrequency transmitter the first stream and the second stream, where the transmitting includes transmitting the first and second streams using respective first and second different antennas. The method where the method includes transmitting with a radiofrequency transmitter the first stream and the second stream, where the transmitting includes combining the first stream and the second stream to provide at the transmitter a transmitter combined radiofrequency signal having the first stream and the second stream, and transmitting the transmitter combined radiofrequency signal having the first and second streams using a single antenna of the transmitter. The method where the method includes transmitting with a radiofrequency transmitter the first stream and the second stream, where the transmitter includes a single antenna, where the method includes transmitting with a radiofrequency transmitter the first stream and the second stream, where the transmitting includes combining the first stream and the second stream to provide at the transmitter a transmitter combined radiofrequency signal having the first stream and the second stream, and transmitting the transmitter combined radiofrequency signal having the first and second streams using a single antenna of the transmitter. The method where radiofrequency receiver includes a single antenna, where the obtaining with a radiofrequency receiver a combined radiofrequency signal includes picking up the combined radiofrequency signal with the single antenna of the radiofrequency receiver, where the method includes transmitting with a radiofrequency transmitter the first stream and the second stream, where the radiofrequency transmitter includes a single antenna, where the transmitting includes combining the first stream and the second stream to provide at the transmitter a transmitter combined radiofrequency signal having the first stream and the second stream, and transmitting the transmitter combined radiofrequency signal having the first and second streams using a single antenna of the transmitter. The method where the method includes examining input and output values of circuitry of a transmitter for obtaining of one or more distortion parameter value of a transmitter distortion source, transmitting by the transmitter the one or more distortion parameter value to the receiver, and activating distortion compensation by the receiver in accordance with the one or more distortion parameter value. The system where the first stream and the second stream occupy a common bandwidth. The system where the recovering a digital bitstream associated to the second stream includes cancelling a contribution of the first stream to the combined radiofrequency signal. The system where the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream, and where the performing a reconstruction includes compensating for distortion by one or more distortion source of signal path propagation circuitry for propagating the first stream using models of the one or more distortion source. The method where the method includes examining input and output values of circuitry of a transmitter for obtaining of one or more distortion parameter value of a transmitter distortion source, transmitting by the transmitter the one or more distortion parameter value to the receiver, where the transmitting by the transmitter the one or more distortion parameter value to the receiver includes activating an encryption process for encrypting the one or more distortion parameter value, where the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream, and where the performing a reconstruction includes compensating for distortion by one or more distortion source using the one or more parameter value. Implementations of the described techniques may include hardware, a method or process, or computer software on a computer-accessible medium.

One general aspect includes a system including: a radiofrequency receiver configured to receive a combined radiofrequency signal having a first stream combined with a second stream, where the first stream has a first power level, and where the second stream has a second power level, the first power level of the first stream being greater than the second power level of the second stream, where the radiofrequency receiver includes one or more antenna; where the radiofrequency receiver is configured for processing the combined radiofrequency signal to recover a first digital bitstream associated to the first stream; and where the radiofrequency receiver is configured for recovering a digital bitstream associated to the second stream using the first digital bitstream. Other embodiments of this aspect include corresponding computer systems, apparatus, and computer programs recorded on one or more computer storage devices, each configured to perform the actions of the methods.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely exemplary. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

The invention claimed is:

1. A method comprising:
obtaining with a radiofrequency receiver a combined radiofrequency signal having a first stream combined with a second stream, wherein the first stream has a first power level, and wherein the second stream has a second power level, the first power level of the first stream being greater than the second power level of the second stream, wherein the radiofrequency receiver includes one or more antenna;

processing the combined radiofrequency signal to recover a first digital bitstream associated to the first stream; and recovering a digital bitstream associated to the second stream using the first digital bitstream, wherein the method includes transmitting with a radiofrequency transmitter the first stream and the second stream, wherein the transmitting includes combining the first stream and the second stream to provide at the transmitter a transmitter combined radiofrequency signal having the first stream and the second stream, and transmitting the transmitter combined radiofrequency signal having the first and second streams using a single antenna of the transmitter.

2. The method of claim 1, wherein the first stream and the second stream occupy a common bandwidth.

3. The method of claim 1, wherein the recovering a digital bitstream associated to the second stream includes cancelling a contribution of the first stream to the combined radiofrequency signal.

4. The method of claim 1, wherein the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream.

5. The method of claim 1, wherein the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream, and wherein the performing a reconstruction includes compensating for distortion by one or more distortion source using models of the one or more distortion source.

6. The method of claim 1, wherein the processing the combined radiofrequency signal to recover a first digital bitstream includes compensating for distortion by one or more distortion source using models of the one or more distortion source.

7. The method of claim 1, wherein the processing the combined radiofrequency signal to recover a first digital bitstream includes compensating for distortion by one or more distortion source of signal path propagation circuitry for propagating the first stream using models of the one or more distortion source, wherein the one or more distortion source includes an amplifier of a radiofrequency transmitter.

8. The method of claim 1, wherein the recovering a digital bitstream associated to the second stream using the first digital bitstream, includes cancelling a contribution of the first stream to the combined radiofrequency signal, and compensating for distortion by one or more distortion source of signal path propagation circuitry for propagating the second stream using models of the one or more distortion sources.

9. The method of claim 1, wherein the obtaining with a radiofrequency receiver a combined radiofrequency signal includes picking up the combined radiofrequency signal with a single antenna of the radiofrequency receiver.

10. The method of claim 1, wherein a transmission system defined by the transmitter and the receiver is a single input (SISO or SIMO) transmission system in which the single antenna is the only transmission antenna of the transmission system.

11. The method of claim 1, wherein the method includes picking up the combined radiofrequency signal with a single antenna of the radiofrequency receiver, and wherein a transmission system defined by the transmitter and the receiver is a single input single output (SISO) transmission system in which the single antenna is the only transmission antenna of the transmission system.

12. The method of claim 1, wherein the method includes modulating the first stream by the transmitter and subsequent to the modulating the first stream by the transmitter amplifying by the transmitter a power level of the first stream with use of first stream power amplification circuitry of the transmitter.

13. The method of claim 1, wherein the transmitter includes in a first propagation path for propagating the first stream, first power level amplification circuitry for amplifying a power level of the first stream and in a second propagation path for propagating the second stream, second power level amplification circuitry for amplifying a power level of the second stream, wherein the method includes amplifying the first and second streams differently by the first power level amplification circuitry and second power level amplification circuitry so that the first stream has the first power level, and wherein the second stream has the second power level.

14. The method of claim 1, wherein a transmission system defined by the transmitter and the receiver is a single input (SISO or SIMO) transmission system in which the single antenna is the only transmission antenna of the transmission system, wherein the method includes modulating the first stream by the transmitter and subsequent to the modulating the first stream by the transmitter amplifying by the transmitter a power level of the first stream with use of first stream power amplification circuitry of the transmitter, wherein the transmitter includes in a first propagation path for propagating the first stream, first power level amplification circuitry for amplifying a power level of the first stream and in a second propagation path for propagating the second stream, second power level amplification circuitry for amplifying a power level of the second stream, wherein the method includes amplifying the first and second streams differently by the first power level amplification circuitry and second power level amplification circuitry so that the first stream has the first power level, and wherein the second stream has the second power level, wherein the method includes examining input and output values of circuitry of a transmitter for obtaining of one or more distortion parameter value of a transmitter distortion source, transmitting by the transmitter the one or more distortion parameter value to the receiver, and activating distortion compensation by the receiver in accordance with the one or more distortion parameter value, and wherein the method includes modulating the first stream and the second stream according to a selected encoding scheme and establishing a power differential, in dB, between the first stream and the second stream to be equal to or greater than a single input single output (SISO) signal to noise ratio (SNR) threshold for the selected encoding scheme.

15. A method comprising:

obtaining with a radiofrequency receiver a combined radiofrequency signal having a first stream combined with a second stream, wherein the first stream has a first power level, and wherein the second stream has a second power level, the first power level of the first stream being greater than the second power level of the second stream, wherein the radiofrequency receiver includes one or more antenna;

processing the combined radiofrequency signal to recover a first digital bitstream associated to the first stream; and recovering a digital bitstream associated to the second stream using the first digital bitstream, wherein the method includes transmitting with a radiofrequency transmitter the first stream and the second stream, wherein the transmitting includes transmitting the first and second streams using respective first and second different antennas.

16. The method of claim 15, wherein the transmitting the first and second streams using respective first and second different antennas includes emitting the first and second streams separately by the respective first and second different antennas so that the first and second streams are combined by interfering pickup of the first and second streams at the one or more antenna of the receiver.

17. A method comprising:

obtaining with a radiofrequency receiver a combined radiofrequency signal having a first stream combined with a second stream, wherein the first stream has a first power level, and wherein the second stream has a second power level, the first power level of the first stream being greater than the second power level of the second stream, wherein the radiofrequency receiver includes one or more antenna;

processing the combined radiofrequency signal to recover a first digital bitstream associated to the first stream; and recovering a digital bitstream associated to the second stream using the first digital bitstream, wherein the method includes one or more of the following selected from the group consisting of (a) and (b), wherein (a) and (b) are as follows (a) examining input and output values of circuitry of a transmitter for obtaining of one or more distortion parameter value of a transmitter distortion source, transmitting by the transmitter the one or more distortion parameter value to the receiver, and activating distortion compensation by the receiver in accordance with the one or more distortion parameter value (b) modulating the first stream and the second stream according to a selected modulation scheme and establishing a power differential, in dB, between the first stream and the second stream to be equal to or greater than a single input single output (SISO) signal to noise ratio (SNR) threshold associated to the selected modulation scheme.

18. The method of claim 17, wherein the method includes examining input and output values of circuitry of a transmitter for obtaining of one or more distortion parameter value of a transmitter distortion source, transmitting by the transmitter the one or more distortion parameter value to the receiver, wherein the transmitting by the transmitter the one or more distortion parameter value to the receiver includes activating an encryption process for encrypting the one or more distortion parameter value, wherein the recovering a digital bitstream associated to the second stream includes cancelling a contribution of the first stream to the combined radiofrequency signal, the cancelling including performing a reconstruction of the contribution of the first stream to the combined radiofrequency signal using the first digital bitstream, and wherein the performing a reconstruction includes compensating for distortion by one or more distortion source using the one or more parameter value.

19. The method of claim 17, wherein the method includes examining input and output values of circuitry of a transmitter for obtaining of one or more distortion parameter value of a transmitter distortion source, transmitting by the transmitter the one or more distortion parameter value to the receiver, and activating distortion compensation by the receiver in accordance with the one or more distortion parameter value.

20. The method of claim 17, wherein the method includes modulating the first stream and the second stream according to a selected modulation scheme and setting a power differential, in dB, between the first stream and the second stream to be equal to or greater than a single input single output (SISO) signal to noise ratio (SNR) threshold associated to the selected modulation scheme.

* * * * *